Nov. 17, 1959  F. RINGS  2,913,259
SIDEBRANCH FITTING FOR MAIN SUPPLY PIPE
Filed Dec. 29, 1954  2 Sheets-Sheet 1
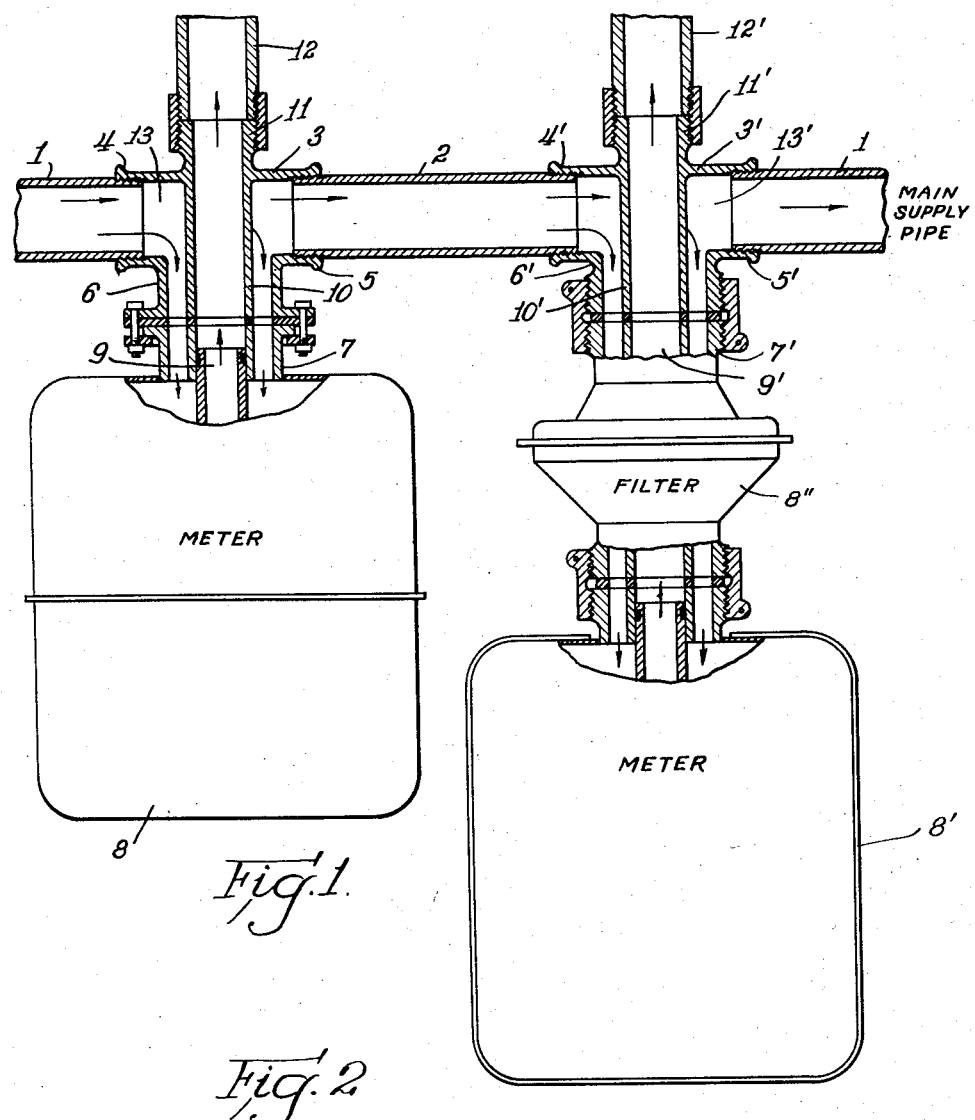
Fig. 1.
Fig. 2.
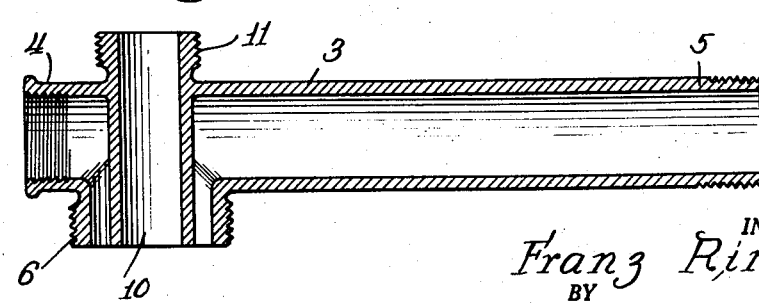
INVENTOR.
Franz Rings
BY
Jones, Darby & Robertson
Attys.

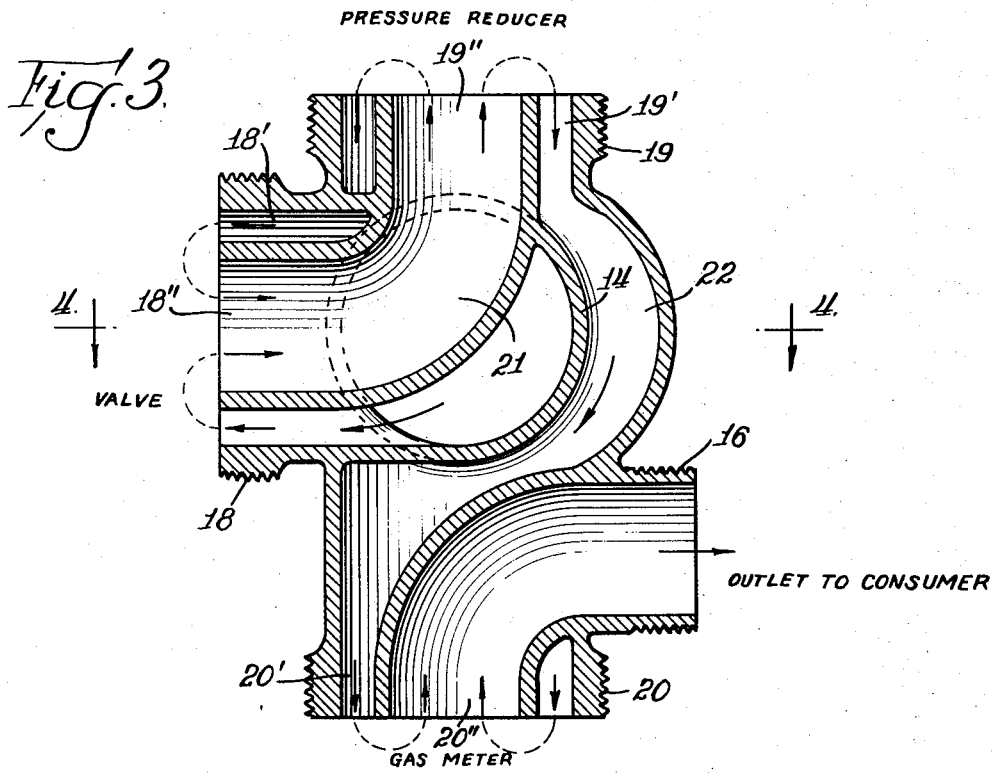
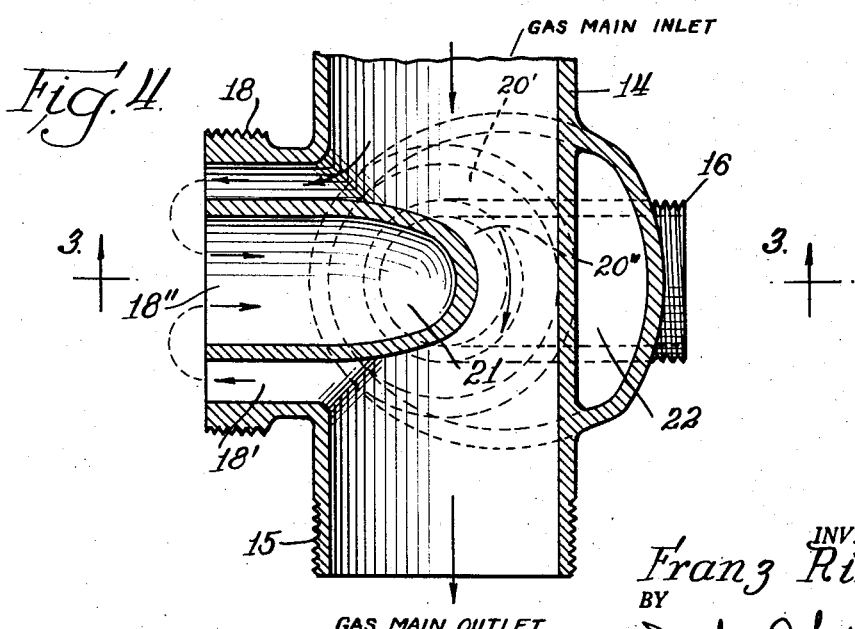

United States Patent Office 2,913,259
Patented Nov. 17, 1959

2,913,259

SIDEBRANCH FITTING FOR MAIN SUPPLY PIPE

Franz Rings, Nahne, near Osnabruck, Germany, assignor to G. Kromschroder Aktiengesellschaft, Osnabruck, Germany Application December 29, 1954, Serial No. 478,315

Claims priority, application Germany January 14, 1954

6 Claims. (Cl. 285—133)

This invention relates to a sidebranch fitting for piping for apparatus to be connected which are fitted with a double-connecting socket, in particular for gas meters. As is known, such fittings for piping serve to tap at one or more points a main pipe line carrying a flowing medium such as gas, the tapped quantity of the medium then being passed through a meter, pressure reducer or similar fluid handling device, and led to a place of consumption. Here may be considered, e.g., the gas supply of a building with several households where the quantities of gas taken from the mains have to pass the gas meters belonging to their respective households before reaching the place of consumption.

In order to enable as simple an installation as possible of the apparatus to be connected, such apparatus, instead of being provided with two separate pipe connections for entry and exit of the medium, have already been fitted with a so-called "double-connecting socket" where the inlet pipe and the exit pipe are arranged one inside the other, both terminating in a common plane. Besides a neater arrangement, this presents the advantage that stresses which might develop in the piping, are not taken up by the apparatus but by a pipe connecting piece or fitting that is fixed into the pipe line and carries one of the aforesaid double-connecting sockets for connecting the apparatus.

This results in a relatively simple installation if it is possible to arrange the apparatus to be connected one above the other at both sides of a vertical supply pipe. The different consumption pipes then are branching off towards both sides of the supply line and the apparatus to be connected are joined to a very simple connecting piece that is fitted to these consumption pipes.

Very often, however, it is necessary to join the apparatus and the consumption pipe to a horizontal supply line. This often permits of a much better use of space or results in a neater arrangement of the apparatus.

The installation of such a sidebranch fitting in piping is sometimes rather complicated, the consumption pipe mostly leading upwards and thus having to cross the main pipe. The invention is therefore based on the task to provide in a simple and profitable manner for the connection to such a horizontal supply line for several apparatus to be connected and consumption pipes all fitted with double-connecting sockets. According to the invention, this is done by means of a fitting which includes an integral double-connecting socket for joining the apparatus and with two opposed connecting branches by means of which it is connected in series in the main supply pipe; the fitting also has a connecting piece that joins the consumption pipe, one opening of the double-connecting socket being connected with the connecting portions of the supply line, and the other opening to the consumption pipe. When fixing such a fitting in the supply pipe, none of the stresses occurring in the piping are transmitted to the apparatus connected. Furthermore, it enables an easy replacement of the apparatus. Besides this, there results a saving in space and a neat arrangement of the pipe system which can be easily surveyed. Should it be intended to branch a vertical consumption pipe off from a horizontal supply line, the fitting is suitably designed in such a manner that the exit duct of the double-connecting socket leading from the apparatus to the consumption pipe, is arranged inside the case of the fitting, preferably in concentric arrangement, and that this exit duct penetrates in a straight line the main supply duct passing through the casing and annular passageway of the double-connecting socket. This "supply duct" then might be considered to form part of the supply line through which the medium can flow, around the exit duct of smaller diameter, to the apparatus which are connected into the main supply pipe beyond it. The medium however can also flow through the annular passageway into the fluid handling device that is generally suspended under the supply line and may then flow through the exit duct upwards into the consumption pipe.

In order to keep as low as possible the number of pipe joints which represent sources of danger in particular with illuminating gas, one of the two connecting branches of the inlet pipe can be lengthened in tubular form, preferably by about the width of the apparatus to be connected, so that with two or more distributing points only two or correspondingly more of the fittings described above need be joined with each other without a separate intermediate length of pipe. It is also possible, however, to manufacture several of such series-connected fittings as a one-part casting, thus as to avoid all pipe joints in the horizontal line at this point.

An especially suitable and simple arrangement results if the fitting is provided with several, preferably three, double-connecting sockets for the apparatus, the duct of the respective double-connecting socket that is joined to the inlet of one of the apparatus, being connected with the two connecting pieces of the supply pipe, one connecting duct joined to the exit of one of the apparatus being connected with the connecting piece of the consumption pipe and for the rest, each connecting duct joined to an apparatus exit being connected to the apparatus inlet duct of another double-connecting socket. For reasons of space it is of advantage if the three simple connecting pieces and three double-connecting sockets are arranged all six at right angles one to the other, with the center-lines of the three double-connecting sockets lying in one plane. Such a fitting for piping allows—just to give one example—to series-connect in a simple manner a valve, a pressure reducer, and a gas meter.

The invention is more fully described by means of two embodiments illustrated in the accompanying drawings.

Fig. 1 is a side elevational view, partly in section, showing two fittings connected in series in a main supply pipe with meters connected thereto, Fig. 2 is a cross-sectional view of a somewhat modified form of the fitting of the invention, Fig. 3 is a cross-sectional view in elevation of a further embodiment of the invention, taken at the line 3—3 of Fig. 4; and Fig. 4 is a cross-sectional view taken at the line 4—4 of Fig. 3.

Two fittings 3, 3' which are connected by a length of pipe 2, are fixed to the gas main 1. These fittings 3, 3' have each two connecting pieces 4, 4' and 5, 5' which are joining them to the main supply pipe 1 and to the portion 2 of the main supply pipe. The fittings 3, 3' are in addition fitted with double-connecting sockets 6, 6' to which are screwed corresponding double-connecting sockets 7, 7' of the apparatus 8, 8''. The apparatus are shown as a gas meter 8 and a filter 8'', a second meter 8' being connected to the filter. Other apparatus, such as pressure reducers, gas cocks or the like of appropriate design may be connected in series with the meter, if desired.

The exit opening 9 of the gas meter 8 and 9' of filter 8'' are connected with integral tubes 10, 10' respectively of the fittings 3, 3', said open-ended tubes forming the inside ducts of the snouts 6, 6' extending out from the casings of the fittings and forming double-connecting sockets therewith. The other ends of the tubes open exteriorly of the casing for connection with sidebranch discharge pipes 12, 12'. The annular passageways of the double-connecting sockets between tubes 10, 10' and snouts 6, 6' open into the ducts 13, 13' comprising the interiors of the casings with which the inlets and outlets of the fittings communicate to form part of the gas main 1. If gas is drawn from the consumer or discharges pipe 12, the gas will flow partly through the annular passageway of the double-connecting socket of snout 6 into the gas meter 8, through this gas meter 8 into the exit duct 10 of the fitting 3 and further into the consumer pipe 12. The gas can also flow around the exit duct 10 through the casing interior 13 to the next fitting so that from both consumer pipes 12 and 12' gas can be drawn and metered independently.

Gas meter 8 and filter 8'' are connected to snouts 6 and 6', respectively, by means of suitable coupling devices, as shown, and meter 8' is connected with filter 8'' by means of a suitable coupling. The flange at the extremity of snout 7 is clamped, as shown, between an underlying ring and a gasket, suitable means, such as bolts clamping the assembly together. Although the flow of gas in main supply pipe 1 may be in either direction, the arrows indicate the flow of gas in one arrangement.

In Figs. 3 and 4 the connecting branches of the casing to which the supply line is joined are designated by the numerals 14 and 15. The numeral 16 is another connecting branch for a consumer pipe.

The connecting branches 14 and 15 open into the interior of the fitting casing forming a through duct 17 which becomes part of the supply line. Perpendicular to this supply duct 17 and at right angles to each other are arranged three double-connecting sockets 18, 19, 20 with inlet and exit openings concentrically fitting into each other. The supply duct 17 is connected with the annular passageway 18' within the snout forming socket 18, whereas the open-ended tube 21 extends through the snouts of sockets 18 and 19 to provide connection between these double sockets at 18'' and 19''. This tube 21 penetrates the through duct 17. A duct 22, by-passing in curved manner the through supply duct 17, runs from the annular passageway 19' of double-connecting socket 19 to the annular passageway 20' of connecting socket 20. The open-ended tube 20'' of this double-connecting socket 20 curves sideways inside the connecting socket 20, penetrates the outside wall of the casing of the fitting and opens into the connecting branch 16 that is to be joined to the consumer pipe.

A shut-off valve fitted with a double-connecting socket can be connected to the double-connecting socket 18, a gas pressure reducer can be connected to the connecting piece 19, and a gas meter, not shown, to the connecting piece 20. The direction of flow of gas through the fitting is shown by the arrows, broken line sections in the arrows at the three double-connecting sockets indicating flow through the respective devices connected therewith, such as the valve, pressure reducer and gas meter. If gas is now drawn from the consumer pipe, a portion of the gas flowing in the main supply pipe and thus in passageway 17 runs through duct 18', through the shut-off valve that is not represented in the drawing, and back through the inlet duct 18''. Through the tube 21, the gas reaches the pressure reducer that is also not shown in the drawing, from where the pressure-regulated gas flows through the ducts 22 and 20' into the gas meter. After passing the gas meter, the gas runs through the tube 20'' to the consumption pipe.

In the main supply pipe, however, the gas can also flow to other similarly arranged fittings in all of which the gas can be independently regulated and measured, or shut-off. This fitting can of course also be used for pipe distributors with any other fluid handling device connected.

I claim:

1. A sidebranch fitting for a gas main supply pipe comprising a casing, a tubular snout integral with and projecting out from said casing and opening into the interior thereof, an open-ended tube integral with said casing and extending through the interior thereof and through said snout concentrically therewith to form an annular passageway therewith opening into the interior of said casing, one end of said tube opening exteriorly of said casing for connection with an outside element, the other end of said tube terminating in the plane of the end of said snout to form a double-connecting socket for connection of said fitting with a gas handling device, and connecting means associated with said socket adapted to connect said gas handling device to said socket at any pre-determined rotational position with reference to the axis of said snout, said casing having an inlet main opening and an outlet main opening therein for connection of said fitting in series in said main supply pipe whereby gas flowing into said casing through said inlet main opening may flow therefrom either through said annular passageway or through said outlet main opening.

2. A sidebranch fitting in accordance with claim 1 wherein the inlet main opening and the outlet main opening are located on opposite sides of the casing whereby the fitting is adapted to be inserted in the main supply pipe with the connecting portions of said supply pipe lying in a straight line.

3. A sidebranch fitting in accordance with claim 2 wherein the snout is disposed at a right angle to the axis of the main openings.

4. A sidebranch fitting for a gas main supply pipe comprising a casing, first, second and third tubular snouts integral with and projecting out from said casing, a first open-ended tube extending between and passing through said first and second snouts concentrically therewith and terminating in the planes of the ends of said first and second snouts respectively to form first and second double-connecting sockets for the connection of said fitting with two gas handling devices, a second open-ended tube extending concentrically through said third snout and terminating at one end in the plane of the end of said third snout to form a third double-connecting socket for the connection of said fitting with another gas handling device, the other end of said second tube opening exteriorly of said casing for connection with a sidebranch discharge pipe, said casing having an inlet main opening and an outlet main opening therein for connection of said fitting in series in said main supply pipe, and a partition defining a passageway connecting said main openings and the annular passageway of said second double-connecting socket whereby gas flowing into said casing through said inlet main opening may flow therefrom either through said annular passageway of said second socket or through said outlet main opening.

5. A sidebranch fitting in accordance with claim 4 wherein the inlet main opening and the outlet main opening are located on opposite sides of the casing whereby the fitting is adapted to be inserted in the main supply pipe with the connecting portions of said supply pipe lying in a straight line.

6. A sidebranch fitting in accordance with claim 4 wherein the axes of all three of the snouts are disposed in a plane which is at right angles to a line extending between the centers of the main openings, the first and third double-connecting sockets are co-axial, and the second socket is disposed at a right angle to the axis of said first and third sockets.

References Cited in the file of this patent

UNITED STATES PATENTS

| | | |
|---|---|---|
| 587,125 | Kennedy | July 27, 1897 |
| 654,615 | Estill | July 31, 1900 |
| 1,143,302 | Moser | June 15, 1915 |
| 1,160,703 | Fleming | Nov. 16, 1915 |
| 1,217,543 | White | Feb. 27, 1917 |
| 2,114,262 | Havens | Apr. 12, 1938 |
| 2,465,997 | Boutillon | Apr. 5, 1949 |
| 2,492,494 | Mueller | Dec. 27, 1949 |